UNITED STATES PATENT OFFICE 2,186,731

PRODUCTION OF COLORED PHOTOGRAPHIC LAYERS

Wilhelm Schneider, Dessau, Anhalt, Germany, assignor, by mesne assignments, to Agfa Ansco Corporation, Binghamton, N. Y., a corporation of Delaware No Drawing. Application May 22, 1937, Serial No. 144,309. In Germany May 23, 1936

17 Claims. (Cl. 95—8)

This invention relates to photographic material.

One of its objects is to provide a photographic material for color photography. Further objects will be seen from the detailed specification following hereafter.

The methods hitherto known for fixing dyestuffs in colloid layers consist in either utilizing the substantive character of an azo-dyestuff to fix it in gelatin or producing an insoluble azo-dyestuff in the gelatin. It is also possible to produce indophenols in fine dispersion in a colloid layer or to introduce into the layer the dyestuff in a vatted condition and subsequently to oxidize it. These processes have the disadvantage that, for example, the substantive azo-dyestuffs diffuse very strongly even at high concentration, while the use of some of the methods involves incorporation in the colloid of a solvent or product of reaction which must subsequently be washed out and in many cases gives rise to damage, as for instance in photographic layers.

This invention is based on the observation that these dyestuffs may be made fast to diffusion if there is introduced into the dyestuff molecule an alkyl residue of high molecular weight and that the fastness to diffusion thus produced does not suffer if a sulfuric acid group, or other group lending solubility in water, is introduced.

In U. S. Patent application Ser. No. 94,340 filed Aug. 5, 1936, there is described a color photograph process in which the dyestuff intermediate product is made fast to diffusion in colloids by the introduction of an alkyl residue having more than 5 carbon atoms. The present invention extends this idea to those photographic materials which contain finished dyestuffs. Such dyestuffs may be made, for example, by treating the dyestuff containing one or more amino groups with a fatty acid chloride or treating an acid chloride of the dyestuff with a fatty amine. Alternatively, the dyestuff may contain originally an alkyl residue of high molecular weight, for example an alkylated benzene ring or an alkylated naphthol ring. The invention is not limited to any specific class of dyestuffs, but is applicable to all classes of dyes. For instance an azo-dyestuff according to the present invention may be prepared by diazotizing an alkyl aniline in which the alkyl radical has a long aliphatic carbon chain, and coupling said diazotized aniline with a phenol- or napthol-sulfonic acid.

The dyestuffs are used for instance for multicolor photography and particularly for multilayer material comprising superimposed layers; also for anti-halation layers and filter layers and for screen covers. When the dyestuffs are introduced into colloids suitable as binding agents, there are formed layers which, on account of their fastness to diffusion, are particularly suitable as filter layers, screening layers and anti-halation layers in the construction of a multi-layer material. They are particularly useful as such layers in combination with those of the aforesaid U. S. patent application for making a material for multi-color photography.

The following examples serve to illustrate the invention, but they are not intended to limit it thereto:

(1) A red, bluish dyestuff which is particularly suitable as a filter dyestuff or multi-color material is made by coupling oleyl-H-acid with diazotized sulfanilic acid.

(2) A yellow dyestuff of the following composition:

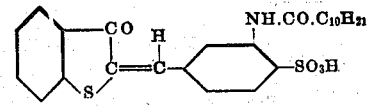

and made as described in U. S. Patent 2,036,546, is particularly suitable for anti-halation purposes.

(3) Another yellow dyestuff corresponding with the formula

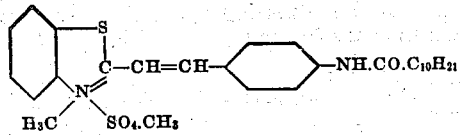

is obtained by condensing 2-methyl-3-methyl-benzthiazole-methylsulfate with p-amino-benzaldehyde and reacting this product with undecoylchloride in the presence of pyridine.

(4) 1 mol "Amidol" is reacted with a stearic acid chloride, 1 mol of sodium acetate being added. The resulting product is converted into the oxazole, an intermediate product of this reaction being the acetylated compound. The dimethylsulfate of the oxazole is caused to react with veratrum-aldehyde. The resulting yellow dyestuff corresponds with the formula

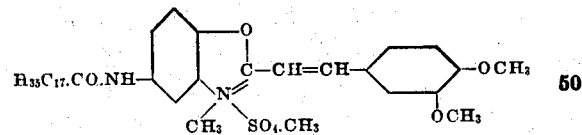

(5) The condensation product from 6-aminoquinaldine dimethylsulfate and p-dimethylaminobenzaldehyde is reacted with undecoylchloride in the presence of organic bases. The resulting red dyestuff corresponds with the formula

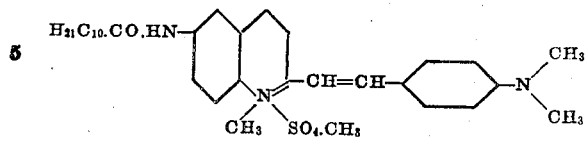

(6) The condensation product from 1.2.3.3-tetramethyl-5-methoxy-indoleninium acetate and o-amino-benzaldehyde is reacted with capric acid chloride in the manner described in Example 5. The resulting orange dyestuff corresponds with the formula

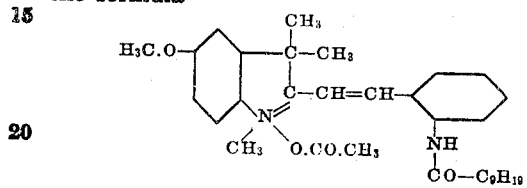

(7) The condensation product from 2-methyl-thiazoline-dimethyl-sulfate and p-amino-benzaldehyde is reacted with undecylenic acid chloride in a manner described in Example 5. The resulting light yellow dyestuff corresponds with the formula

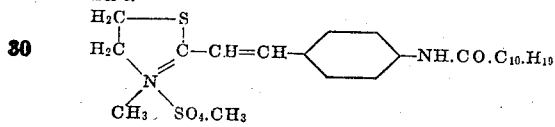

(8) The condensation product from 2-methyl-5-dimethylamino-benzthiazole-dimethylsulfate and p-amino-benzaldehyde is reacted with undecoylchloride as described above. The resulting reddish dyestuff corresponds with the formula

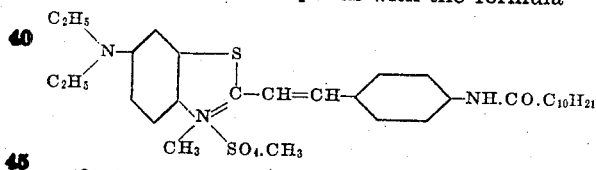

(9) The condensation product from 2-methyl-4-phenylthiazole-dimethylsulfate and 4-amino-benzaldehyde-3-sulfonic acid is reacted with ricinoleic acid chloride in the manner described above. The resulting light yellow dyestuff corresponds with the formula

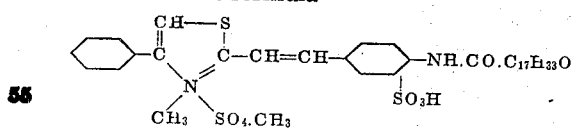

(10) 1(3'-amino-5'-sulfo)-phenyl-3-methyl-5-pyrazolone is condensed with stearic acid chloride and is coupled with p-dimethylamino-aniline in the presence of an oxidizing agent. As an oxidizing agent, for instance, potassium ferricyanide in an alkaline solution may be used. The resulting red dyestuff corresponds with the formula

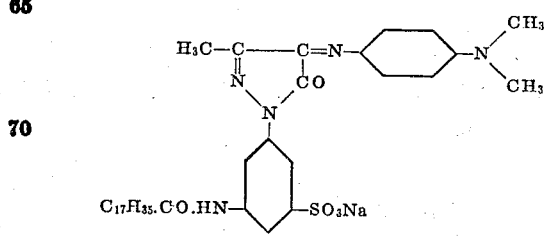

(11) 5-amino-α-naphthol is reacted with stearic acid chloride, the resulting product is sulfonated and coupled with p-diethyl-amino-aniline in the presence of an oxidizing agent. The resulting blue dyestuff corresponds with the formula

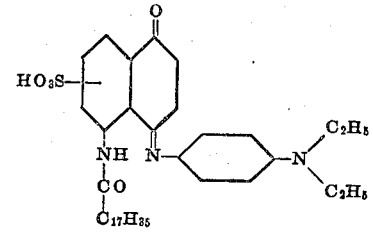

What I claim is:

1. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl radical of a carbon chain of more than 5 carbon atoms linked to an atom of its molecule by a linkage selected from the group consisting of the acid amide-, ester-, and direct carbon to carbon linkage.

2. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an aliphatic acyl radical having a carbon chain of more than 5 carbon atoms linked to an amino group of the dyestuff molecule.

3. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl amino radical with a carbon chain of more than 5 carbon atoms linked to a carboxylic acid group of the dyestuff molecule.

4. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl radical of a carbon chain of 10 to 18 carbon atoms linked to an atom of its molecule by a linkage selected from the group consisting of the acid amide-, ester-, and direct carbon to carbon linkage.

5. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an aliphatic acyl radical having a carbon chain of 10 to 18 carbon atoms linked to an amino group of the dyestuff molecule.

6. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl amino radical with a carbon chain of 10 to 18 carbon atoms linked to a carboxylic acid group of the dyestuff molecule.

7. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl radical of a carbon chain of more than 5 carbon atoms linked to an atom of its molecule by a homopolar linkage.

8. A photographic element comprising at least one silver halide emulsion layer, a colored filter layer in contact with said silver halide emulsion layer, said filter layer containing a dyestuff which is fast to diffusion with respect to the binding agent of said layer, said dyestuff having an alkyl radical of a carbon chain of 10 to 18 carbon atoms linked to an atom of its molecule by a homopolar linkage.

9. The photographic element defined in claim 1, wherein said dyestuff is an azo dyestuff.

10. The photographic element defined in claim 1, wherein said dyestuff is a styryl dyestuff.

11. The photographic element defined in claim 1, wherein said dyestuff is a styryl dyestuff and in which the heterocyclic nucleus thereof is selected from the class consisting of a benzthiazole, benzoxazole, quinoline, indoline and thiazole nucleus.

12. The photographic element defined in claim 1, wherein the dyestuff is a styryl dyestuff in which the heterocyclic nucleus thereof is selected from the class consisting of a benzthiazole, benzoxazole, quinoline, indoline and thiazole nucleus, said alkyl radical being linked to a carbon atom of the benzo ring of the heterocyclic nucleus by an acid amide linkage.

13. The photographic element defined in claim 1, wherein said dyestuff is produced by coupling in the presence of an oxidizing agent a p-dialkyl-amino-aniline with a condensation product of a compound selected from the group consisting of an amino-pyrazolone and an amino-naphthol with a fatty acid having from 10 to 18 carbon atoms.

14. A photographic element comprising at least one silver halide emulsion layer, a colored filter layer in contact with said silver halide emulsion layer, said filter layer containing a dyestuff which is fast to diffusion with respect to the binding agent of said layer, said dyestuff being obtained by coupling oleyl-H-acid with diazotized sulfanilic acid.

15. A photographic element comprising at least one silver halide emulsion layer, a colored filter layer in contact with said silver halide emulsion layer, said filter layer containing a dyestuff which is fast to diffusion with respect to the binding agent of said layer, said dyestuff having the following formula:

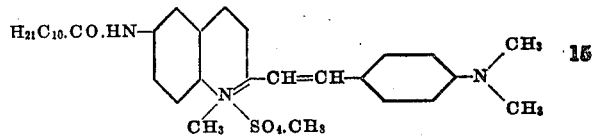

16. A photographic element comprising at least one silver halide emulsion layer, a colored filter layer in contact with said silver halide emulsion layer, said filter layer containing a dyestuff which is fast to diffusion with respect to the binding agent of said layer, said dyestuff having the following formula:

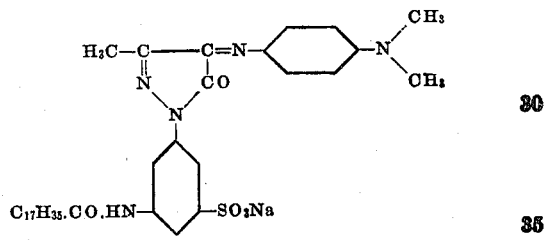

17. A photographic element comprising at least three contacting layers in super-position, one layer being a base, at least one layer being a silver halide emulsion layer and one layer being a colored colloidal light-absorbing layer containing a dyestuff which is fast to diffusion with respect to the colloid of said layer, said dyestuff having an alkyl radicle of a carbon chain of more than 5 carbon atoms linked to an atom of its molecule by a homopolar linkage.

WILHELM SCHNEIDER.